(12) United States Patent
Corva (10) Patent No.: US 12,388,360 B2
(45) Date of Patent: Aug. 12, 2025

(54) CHARGE CONTROL FOR RESONANT CONVERTERS

(71) Applicant: STMicroelectronics International N.V., Geneva (CH)

(72) Inventor: Giulio Renato Corva, Milan (IT)

(73) Assignee: STMicroelectronics International N.V., Geneva (CH)

( * ) Notice: Subject to any disclaimer, the term of this patent is extended or adjusted under 35 U.S.C. 154(b) by 388 days.

(21) Appl. No.: 18/172,892

(22) Filed: Feb. 22, 2023

(65) Prior Publication Data

US 2024/0283357 A1    Aug. 22, 2024

(51) Int. Cl.
H02M 3/00    (2006.01)
H02M 1/08    (2006.01)
H02M 3/335   (2006.01)

(52) U.S. Cl.
CPC .............. *H02M 3/01* (2021.05); *H02M 1/08* (2013.01); *H02M 3/33571* (2021.05)

(58) Field of Classification Search
CPC ...... H02M 3/01; H02M 1/08; H02M 3/33571; H02M 1/0058; H02M 1/088
See application file for complete search history.

(56) References Cited

U.S. PATENT DOCUMENTS

| | | | |
|---|---|---|---|
| 3,953,779 A | 4/1976 | Schwarz | |
| 4,150,424 A | 4/1979 | Nuechterlein | |
| 4,694,383 A | 9/1987 | Nguyen et al. | |
| 5,550,498 A | 8/1996 | Kwan et al. | |
| 6,018,467 A | 1/2000 | Majid et al. | |
| 6,351,401 B1 | 2/2002 | Scheel et al. | |
| 6,822,881 B2 | 11/2004 | Elferich | |
| 7,313,004 B1 | 12/2007 | Yang et al. | |
| 7,800,928 B1 | 9/2010 | Dernovsek et al. | |
| 8,085,559 B1 | 12/2011 | Choi | |
| 8,446,137 B2 * | 5/2013 | Mariani | H03K 7/08 323/224 |
| 8,670,255 B2 | 3/2014 | Gong et al. | |
| 8,804,377 B2 | 8/2014 | Adragna et al. | |
| 9,019,725 B2 | 4/2015 | Cantoro | |

(Continued)

FOREIGN PATENT DOCUMENTS

DE    2530631 A1    1/1977

OTHER PUBLICATIONS

Adragna et al., "Cycle-by-cycle Average Input Current Control of Resonant Converters," 2020 *International Symposium on Power Electronics, Electrical Drives, Automation and Motion (SPEEDAM)*, Sorrento, Italy, Jun. 24-26, 2020, IEEE. (7 pages).

(Continued)

*Primary Examiner* — Kyle J Moody
(74) *Attorney, Agent, or Firm* — Seed Intellectual Property Law Group LLP (57) ABSTRACT

A method and apparatus for controlling a converter are provided. In the method and apparatus, a controller determines a difference between an on-time and an off-time of a command signal representative of a switching signal of the converter. The controller generates a control signal based on the difference between the on-time and the off-time and compensates a first signal representative of a current of a resonant tank of the converter using the control signal. The controller generates the switching signal based on the compensated first signal.

20 Claims, 3 Drawing Sheets

(56) References Cited

U.S. PATENT DOCUMENTS

| | | | |
|---|---|---|---|
| 10,164,528 B2 * | 12/2018 | Moon | H02M 1/36 |
| 10,892,688 B2 * | 1/2021 | Chen | H02M 1/38 |
| 11,437,918 B2 | 9/2022 | Lin et al. | |
| 2002/0000796 A1 | 1/2002 | Popescu | |
| 2002/0071301 A1 | 6/2002 | Kinghorn | |
| 2005/0265058 A1 | 12/2005 | Stevanovic et al. | |
| 2008/0278984 A1 | 11/2008 | Stanley | |
| 2009/0196074 A1 | 8/2009 | Choi | |
| 2009/0251926 A1 | 10/2009 | Choi et al. | |
| 2018/0054134 A1 * | 2/2018 | Moon | H02M 1/08 |
| 2018/0191252 A1 * | 7/2018 | Bianco | H02M 3/01 |
| 2022/0209674 A1 | 6/2022 | Wang et al. | |

OTHER PUBLICATIONS

Tang et al., "Charge Control: Modeling, Analysis and Design," Power Electronics Specialists Conference, 23rd Annual IEEE, vol. 1, pp. 503-511, 1992.

Tang et al., "Charge Control for Zero-Voltage-Switching Multi-Resonant Converter," Power Electronics Specialists Conference, 24th Annual IEEE, pp. 229-233, 1993.

Jin et al., "Multiphase LLC Series Resonant Converter for Microprocessor Voltage Regulation," Industry Applications Conference, 2006, 41st IAS Annual Meeting, vol. 5., pp. 2136-2143, Oct. 8-12, 2006.

Nalbant, "A New and Improved Control Technique Greatly Simplifies The Design of ZVS Resonant Inveters and DC/DC Power Supplies," Tenth Annual Applied Power Electronics Conference and Exposition, 1995, (APEC '95), vol. 2, pp. 694-701, Mar. 5-9, 1995.

\* cited by examiner

CHARGE CONTROL FOR RESONANT CONVERTERS

BACKGROUND

Technical Field

The present disclosure is directed to controlling a converter and, in particular, controlling the converter to mitigate current imbalance in the converter.

Description of the Related Art

A resonant converter is typically controlled by feeding back a signal representative of an output voltage of the converter and using the signal to control a switching of the converter. The primary and secondary sides of the converter are typically galvanically isolated using a transformer and an optocoupler. In particular, the signal representative of the output voltage of the converter is fed back through the optocoupler to maintain galvanic isolation between the primary and secondary sides.

BRIEF SUMMARY

A converter may employ two diodes on the converter's secondary side, whereby the two diodes may be used to supply current to a load. It is desirable for the currents passing through the diodes to be symmetric. The currents may be symmetric when the currents largely correspond to each other, but are set apart from each other by a phase. The currents may become asymmetric due to artifacts in the controller. For example, the currents of the diodes may become asymmetric when there is an imbalance in the currents of the controller or when an offset is introduced in the controller.

The controller mitigates the asymmetry by determining a difference between an on-time of a signal representative of the switching of the converter and an off-time of the signal. The controller then compensates a feedback signal using the difference. The controller may compensate a feedback signal representative of a current in the resonant tank of the converter using the difference. The compensation may mitigate the diode current asymmetry.

DETAILED DESCRIPTION

Figure 1:
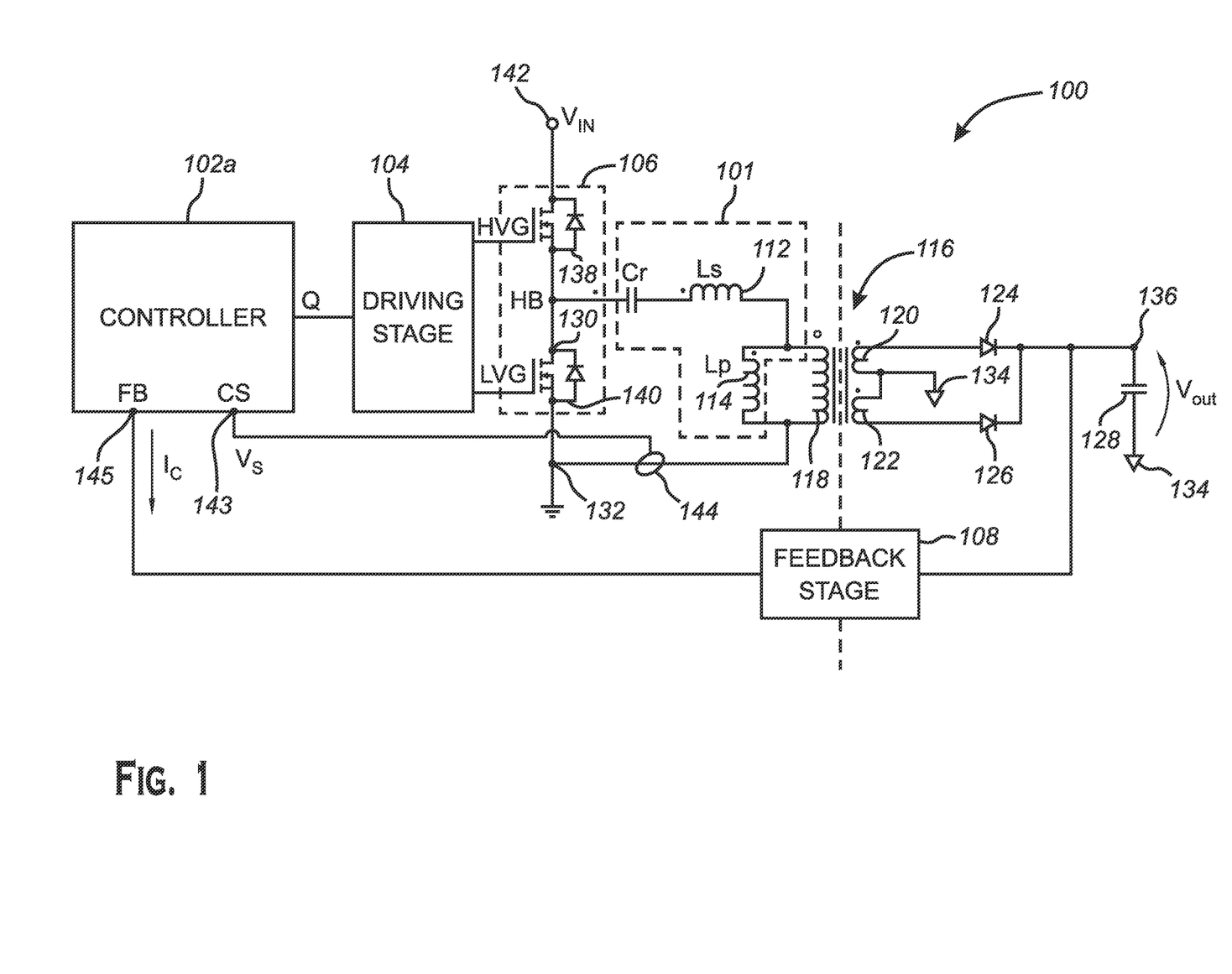
FIG. 1 shows a circuit diagram of an LLC resonant converter coupled to control stages of the converter.

FIG. 1 shows a circuit diagram of an LLC resonant converter 100 coupled to control stages of the converter 100. The control stages include a controller 102a, a driving stage 104 and a feedback stage 108. The LLC resonant converter 100 includes a switching stage 106 and a resonant tank 101 having two inductances (a resonant inductance 112 (denoted as 'Ls') and a shunt inductance 114 (denoted as 'Lp')) and one capacitance (a resonant capacitance 110 (denoted as 'Cr')). The converter 100 also includes a transformer 116 having a primary winding 118 in a primary side of the converter 100 (and the transformer 116). The primary winding 118 and the primary side are galvanically isolated from two secondary windings of a secondary side. The two secondary windings include a first secondary winding 120 and a second secondary winding 122. The converter 100 also includes a first diode 124, a second diode 126 and an output capacitance 128.

The resonant capacitance 110 has a first side coupled to a half bridge node 130 (denoted as 'HB') of the switching stage 106. The resonant capacitance 110 has a second side coupled to a first terminal of the resonant inductance 112. The resonant inductance 112 has a second terminal coupled to both a first terminal of the shunt inductance 114 and a first terminal of the primary winding 118. The shunt inductance 114 and the primary winding 118 each have second terminals that are coupled to each other and together coupled to a primary side reference voltage node 132. The primary side reference voltage node 132 may be a ground node of the primary side.

The transformer's 116 secondary side is center-tapped. The first secondary winding 120 and the second secondary winding 122 each have first terminals that are coupled to each other and to a secondary side reference voltage node 134. The first secondary winding 120 has a second terminal coupled to an anode of the first diode 124. The second secondary winding 122 has a second terminal coupled to an anode of the second diode 126. The first and second diodes 124, 126 each have cathodes that are coupled to an output voltage node 136. The output capacitance 128 is coupled between the output voltage node 136 and the secondary side reference voltage node 134, which may be a ground node.

The feedback stage 108, which may be an isolated feedback stage, such as an optocoupler, has an input coupled to the output voltage node 136 and an output coupled to the controller 102a. The feedback stage 108 outputs, to the primary side, a signal (current $I_C$) representative of the output voltage while maintaining the galvanic isolation between the primary and secondary sides.

The switching stage 106 includes a first transistor 138 and a second transistor 140. Although the first and second transistors 138, 140 are shown as n-channel metal-oxide semiconductor field-effect transistors (MOSFETs), it is noted that the first and second transistors 138, 140 may be any other type of transistor or switch. The first transistor 138 has a source coupled to an input voltage node 142, a drain coupled to the half bridge node 130 and a gate for receiving a high side gate drive signal (denoted as 'HVG') from the driving stage 104. The input voltage node 142 supplies an input voltage (VIN) to the converter 100 via the first transistor 138. The second transistor 140 has a source coupled to the half bridge node 130, a drain coupled to the primary side reference voltage node 132 and a gate for receiving a low side gate drive signal (denoted as 'LVG') from the driving stage 104.

The driving stage 104 has an input coupled to an output of the controller 102a. The driving stage receives a switching signal (Q) from the controller 102a. The switching signal has on and off states, which are also referred to as activated and deactivated states, respectively, and asserted and deasserted states, respectively. The driving stage 104 determines the states of the high side gate drive signal and the low side gate drive signal based on the switching signal received from the controller 102a. The driving stage 104 then generates the high side and low side gate drive signals and outputs the high side and low side gate drive signals to the converter 100.

The controller 102a generates the switching signal (Q) based on various feedback signals. The control techniques described herein use one or more of the plurality of feedback signals for controlling the converter 100. The controller 102a receives at a second input (FB) 145 the current ($I_C$) representative of the output voltage ($V_{OUT}$) of the converter 100. The controller 102a is also coupled to a primary side current sensing stage 144. The primary side current sensing stage 144 may include a sense resistance coupled to the primary side reference voltage node 132. The controller receives a voltage (referred to as $V_S$) representative of the primary side current or the current of the resonant tank 101 at a first input (CS) 143 of the controller 102a. The voltage ($V_S$) representative of the primary side current or the current of the resonant tank 101 may be available externally to the controller 102a. The controller 102a controls operation of the converter 100 based on the current representative of the output voltage and the voltage representative of the primary side current.

It is noted that although the current ($I_C$) is described herein as being representative of the output voltage ($V_{OUT}$) of the converter 100, in various embodiments, the current ($I_C$) may be representative of the output current ($I_{OUT}$) of the converter 100. In some applications, such light emitting diodes (LEDs), the converter 100 delivers a regulated output current to a load rather than a regulated output voltage ($V_{OUT}$). In such embodiments, the control loop operates to maintain a constant output current ($I_{OUT}$), and the control current ($I_C$) is, therefore, representative of the output current ($I_{OUT}$). The current ($I_C$) may be representative of either the output voltage or the output current (i.e., whichever output parameter is to be controlled).

It is noted that sensing may also be carried out in other ways, such as through a capacitive or resistive divider, or a current transformer or Hall sensor, among others, to provide a voltage signal accurately representative of the instantaneous current flowing in the resonant tank circuit.

The controller 102a generates the switching signal (Q) based on one or more of the feedback signals. The controller 102a outputs switching signal to the driving stage 104, which in turn generates the high side and low side gate drive signals based on the switching signal. The high side and low side gate drive signals are in phase opposition, whereby if the high side gate drive signal (HVG) is asserted, the low side gate drive signal (LVG) is deasserted and vice-versa. The controller 102a may assert the high side gate drive signal (HVG) (and deassert the low side gate drive signal (LVG)) when the switching signal (Q) is asserted. Conversely, the controller 102a may deassert the high side gate drive signal (HVG) (and assert the low side gate drive signal (LVG)) when the switching signal (Q) is deasserted.

When the high side gate drive signal is asserted, the input voltage (VIN) is supplied to the first side of the resonant capacitance 110 to drive the resonant tank 101. When the low side gate drive signal is asserted, the primary side reference voltage, which may be ground voltage, is supplied to the first side of the resonant capacitance 110 to drive the resonant tank 101. When the resonant tank 101 is driven, energy in the primary side is transferred by the transformer 116 to the secondary side.

In the secondary side, the first and second diodes 124, 126 perform full-wave rectification that produces the output voltage ($V_{OUT}$) at the output voltage node 136. The output capacitance 128 buffers and stabilizes the output voltage ($V_{OUT}$). A load (not shown) may be coupled between the output voltage node 136 and the secondary side reference voltage node 134. The load is thereby driven by the output voltage ($V_{OUT}$).

It is noted that although the transformer 116 is shown to include two secondary winding 120, 122, in various embodiments other configurations of the transformer 116 (and the converter 100) may be used. For example, a single secondary winding may be used together with a full bridge diode rectification in the secondary side of the converter 100.

The controller 102a may employ one or more closed-loop control techniques. For example, the controller 102a may use direct frequency control (DCF), which controls the switching frequency as to accommodate load demands. Further, the controller 102a may use a charge control technique. The charge control technique may use dual-loop control. An inner loop controls switch commutation based on an intermediate variable and on sensed converter variables (such as, resonant tank voltage or current). The intermediate variable may be generated by an outer loop (or a voltage loop).

One example of charge control is Average Input Current Control (AICC). In AICC, various techniques may be used to drive the first and second transistors 138, 140 using the high side gate drive signal (HVG) and the low side gate drive signal (LVG), respectively. The controller 102a may perform symmetric control. The controller 102a may use an integrator and two comparators to drive the first and second transistors 138, 140 in a symmetrical and complementary manner.

Additionally or alternatively, the controller 102a may use a comparator to trigger the first transistor 138 to turn off using the high side gate drive signal (HVG). The controller 102a may measure the on-time duration of the high side gate drive signal (HVG) and set the on-time duration of the low side gate drive signal (LVG) to the on-time duration of the high side gate drive signal (HVG). For example, the controller 102a may use a timer circuit to measure or set the time.

Accordingly, the controller 102a may drive the first and second transistors 138, 140 to have equal and complementary on-time durations. Thus, the first and second transistors 138, 140 may commutate in complementary manner. The controller 102a may insert or add a dead time between the on-time and off-time durations of the first and second transistors 138, 140 to avoid or mitigate cross-conduction. In addition, the on-time durations and the off-time durations of the first and second transistors 138, 140 may be the same.

Figure 2:
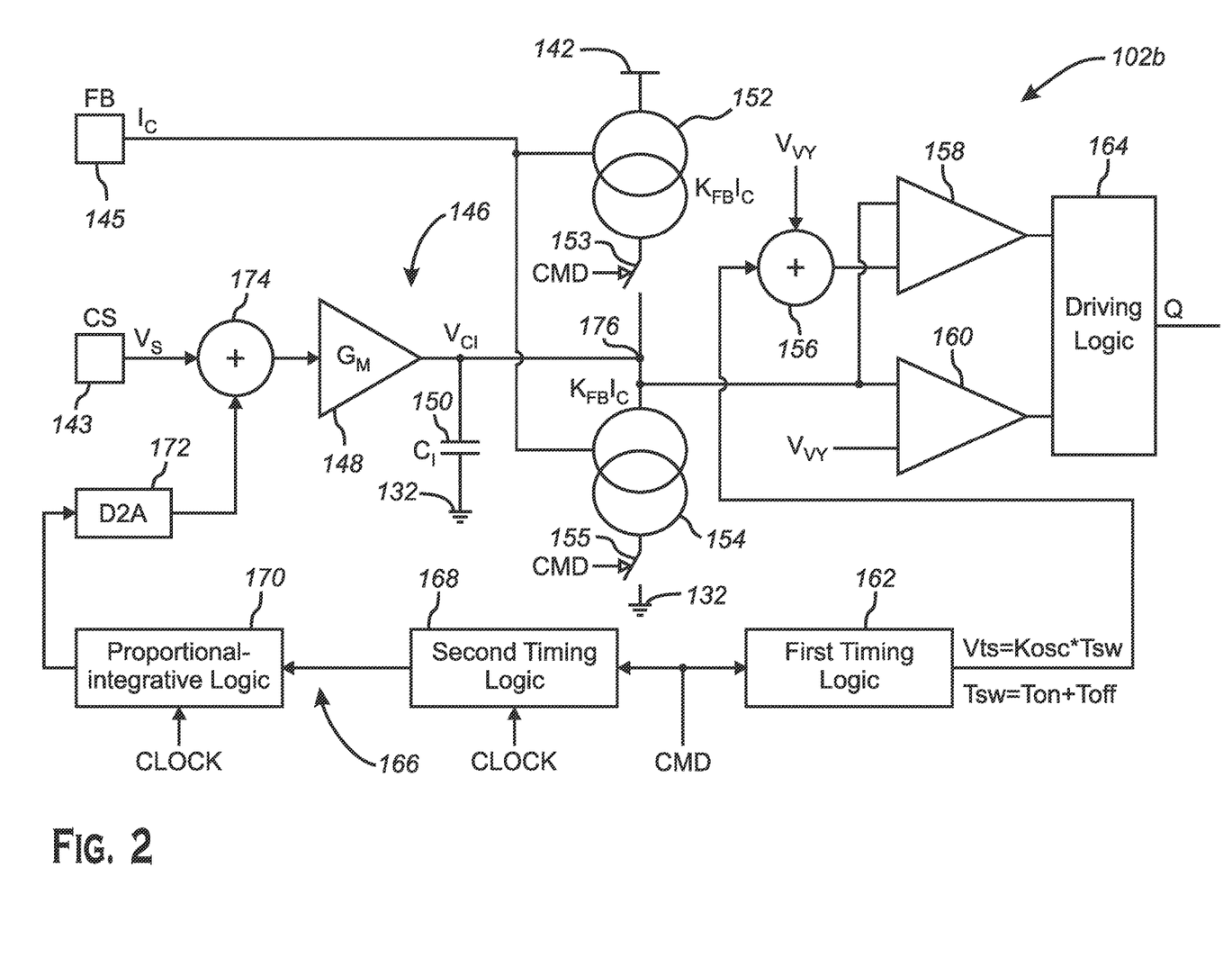
FIG. 2 show a controller of the converter in accordance with an embodiment.

FIG. 2 show a controller 102b of the converter 100 in accordance with an embodiment. The controller 102b includes an integrator 146. The integrator 146 includes a transconductance amplifier ($G_M$) 148 and a capacitance ($C_I$) 150. The controller 102b includes first and second current sources 152, 154, first and second switches 153, 155, a first adder 156, first and second comparators 158, 160, first timing logic 162 and driving logic 164. The controller 102b includes a current balancing stage 166. The current balancing stage 166 includes second timing logic 168, proportional-integrative logic 170, a digital-to-analog converter 172 and a second adder 174.

The second adder 174 has a first input coupled to the first input 143 of the controller 102b, a second input coupled to an output of the digital-to-analog converter 172 and an output. The transconductance amplifier 148 has an input coupled to the output of the second adder 174 and an output. The capacitance 150 has a first side coupled to the output of the transconductance amplifier 148 (at control node 176) and a second side coupled to the primary side reference voltage node 132.

The first current source 152 has an anode coupled to the input voltage node 142, a control terminal coupled to the second input 145 of the controller 102b and a cathode. The first switch 153 has a first terminal coupled to the cathode of the first current sources 152, a second terminal coupled to the control node 176 and a control terminal configured to receive a command signal (CMD).

The command signal (CMD) may be based on the switching signal (Q), the high side gate drive signal (HVG) or the low side gate drive signal (LVG). For example, the on-time of the command signal (CMD) may be the on-time of the high side gate drive signal (HVG) as decreased by a dead time. The off-time of the command signal (CMD) may be the on-time of the low side gate drive signal (LVG) as increased by the dead time. The on-time of the command signal (CMD) may be the on-time of the switching signal (Q) as decreased by a dead time, and the off-time of the command signal (CMD) may be the off-time of the switching signal (Q) as increased by the dead time.

The second switch 155 has a first terminal coupled to the primary side reference voltage node 132, a control terminal configured to receive the command signal (CMD) and a second terminal. The second current source 152 has a cathode coupled to the second terminal of the second switch 155, an anode coupled to the control node 176 and a control terminal configured to receive the command signal (CMD).

The first timing logic 162 has an input configured to receive the command signal (CMD) and an output configured to provide a voltage (Vts) representative of a switching period ($T_{SW}$) of the command signal (CMD). The first adder 156 has a first input coupled to the output of the first timing logic 162, a second input configured to receive a first threshold voltage ($V_{VY}$) and an output configured to provide a second threshold voltage that is a sum of the voltage (Vts) representative of the switching period ($T_{SW}$) and the first threshold voltage ($V_{VY}$).

The first comparator 158 has a first input coupled to the control node 176, a second input coupled to the output of the first adder 156 (and configured to receive the second threshold voltage) and an output. The second comparator 160 has a first input coupled to the control node 176, a second input configured to receive the first threshold voltage ($V_{VY}$) and an output. The driving logic 164 has first and second inputs coupled to the output of the first comparator 158 and the output of the second comparator 160, respectively. The driving logic 164 has an output configured to output the switching signal (Q) to the driving stage 104.

The second timing logic 168 has a first input configured to receive the command signal (CMD), a second input configured to receive a clock signal and an output configured to output a signal representative of a difference between an on-time (Ton) (on state time, activation time or assertion time) and an off-time (Toff) (off state time, deactivation time or deassertion time) of the command signal (CMD). The proportional-integrative logic 170 has an input configured to receive the signal representative of the difference between the on-time and the off-time and an output configured to output a signal representative of an integral of the difference. The digital-to-analog converter 172 has an input coupled to the output of the proportional-integrative logic 170 and an output coupled to the second input of the second adder 174. The digital-to-analog converter 172 outputs a control signal ($V_{control}$) to the second adder 174.

During operation, the second adder 174 sums the voltage ($V_S$) representative of the current of the resonant tank 101 and the control signal ($V_{control}$). The integrator 146 integrates the sum of the current of the resonant tank 101 and the control signal ($V_{control}$) and charges the control node 176 to a voltage ($V_{CI}$) according to the integral. The current ($I_C$) representative of the output voltage ($V_{OUT}$) is also fed to the control node 176 by operation of the first and second current sources 152, 154 and the first and second switches 153, 155.

When the command signal (CMD) is asserted, the first switch 153 is closed and the second switch 155 is open. The first current source 152 is controlled to supply a current to the control node 176 that is a function of (e.g., proportional to) the current ($I_C$) representative of the output voltage ($V_{OUT}$). When the command signal (CMD) is deasserted, the first switch 153 is open and the second switch 155 is closed. The first current source 152 no longer supplies current to the control node 176. Instead, the second current source 154 sinks current from the control node 176. The second current source 154 is controlled by the current ($I_C$) representative of the output voltage ($V_{OUT}$), and the second current source 154 sinks current that is a function of (e.g., proportional to) the current ($I_C$). The first and second current sources 152, 154 provide either positive or negative gain depending on which of the first and second switches 153, 155 is closed.

The first timing logic 162 determines the switching period ($T_{SW}$), e.g., as a sum of the on-time (Ton) and the off-time (Toff) of the command signal (CMD). The first timing logic 162 outputs the voltage (Vts) representative of the switching period ($T_{SW}$). The first timing logic 162 may output the voltage (Vts) as a product of the switching period ($T_{SW}$) and a factor ($K_{OSC}$), e.g., $Vts = K_{OSC} * T_{SW}$.

The first adder 156 sets the second voltage threshold to be greater than the first threshold voltage by the voltage (Vts). The first comparator 158 compares the voltage ($V_{CI}$) of the control node 176 with the second threshold voltage. The first comparator 158 asserts its output in response to the voltage ($V_{CI}$) of the control node 176 exceeding the second threshold voltage and deasserts its output if the voltage ($V_{CI}$) of the control node 176 is less than or equal to the second threshold voltage.

The second comparator 160 compares the voltage ($V_{CI}$) of the control node 176 with the first threshold voltage. The second comparator 160 asserts its output in response to the voltage ($V_{CI}$) of the control node 176 being less than the first threshold voltage and deasserts its output if the voltage ($V_{CI}$) of the control node 176 is greater than or equal to the first threshold voltage.

The driving logic 164 sets the switching signal (Q) based on the outputs of the first and second comparators 158, 160. For example, the driving logic 164 may deassert the switching signal (Q) (to cause the high side gate drive signal (HVG) to become deasserted and transition the first transistor 138 to the non-conductive state) in response to the output of the first comparator 158 being asserted. The driving logic 164 may assert the switching signal (Q) (to cause the high side gate drive signal (HVG) to become asserted and transition the first transistor 138 to the conductive state) in response to the output of the second comparator 160 asserted.

In the current balancing stage 166, the second timing logic 168 receives the command signal (CMD) and determines a difference between the on-time (Ton) and the off-time (Toff) of the command signal (CMD). The second timing logic 168 may receive a clock signal and determine the difference as a number of clock cycles of the clock signal. For example, the second timing logic 168 may increment a counter every clock cycle of the clock signal during the on-time (Ton) and decrement the counter every clock cycle of the clock signal during the off-time (Toff) or vice-versa. The second timing logic 168 may include a counter (e.g., a clocked up-down counter) and an accumulator. The second timing logic 168 may increment the counter during the on-time and decrement the counter during the off-time. A final count of the counter may represent the difference. The second timing logic 168 may initialize the counter to zero at the end of the switching period. A positive count represents a longer on-time duration than an off-time duration and vice-versa. A count of zero represents equal durations of the on-time and off-time.

For a switching period indexed by an index k, the difference between the on-time (Ton) and the off-time (Toff) determined may be represented as:

$$\frac{Ton_k - Toff_k}{T_{clock}}, \qquad \text{Equation (1)}$$

where $T_{clock}$ is the clock duration.

The proportional-integrative logic 170 may be a proportional-integral (PI) controller. The proportional-integrative logic 170 receives the difference from the second timing logic 168. The proportional-integrative logic 170 may generate a weighted combination of the difference for a current switching period and the differences of one or more previous switching periods. For example, when a switching period indexed by an index i precedes the switching period indexed by the index k, the output of the proportional-integrative logic 170 may be represented as:

$$\frac{V_{eq}(Ton_i - Toff_i) - \lambda(Ton_k - Toff_k)}{T_{clock}} \qquad \text{Equation (2)}$$

where $\lambda$ is a factor or a multiplier and $V_{eq}$ is a voltage value.

The output of the proportional-integrative logic 170 may be any linear combination of the cumulative difference between on-time and off-time of the command signal (CMD). The output of the proportional-integrative logic 170 may be a signed array of bits representing the proportional-integral contribution. In some embodiments, one or more least significant bits of the array may be discarded to achieve coarser (rather than finer) control.

The digital-to-analog converter 172 receives the output of the proportional-integrative logic 170. The digital-to-analog converter 172 converts the output of the proportional-integrative logic 170, which it represented digitally, to the control signal ($V_{control}$) having an analog representation. The second adder 174 sums the voltage ($V_S$) representative of the current of the resonant tank 101 and the control signal ($V_{control}$).

Imbalance and a lack of symmetry between the on-time and the off-time of the high side gate drive signal (HVG) or the low side gate drive signal (LVG) results in uneven current distribution through the first and second diodes 124, 126. When the currents passing through the diodes 124, in 126 are uneven or symmetric, the reliability of the converter decreases and power dissipation increases. The on-time/off-time imbalance may also be caused by the fact that the transconductance amplifier ($G_M$) 148 has an offset at its input. Further, the imbalance may be caused by mismatches between the currents sourced by the first and second current sources 152, 154.

The current balancing stage 166 aids in causing the high side gate drive signal (HVG) or the low side gate drive signal (LVG) to be symmetric. The current balancing stage 166 aids in causing the on-times of the high side gate drive signal (HVG) and the low side gate drive signal (LVG) to be equal and the off-times of the high side gate drive signal (HVG) and the low side gate drive signal (LVG) to be equal. The current balancing stage 166 mitigates imbalance or unequal currents in the first and second diodes 124, 126. The control technique mitigates the effect of converter or controller element mismatches. The current balancing stage 166 determines the difference between the on-time and off-time of the command signal (CMD). The current balancing stage 166 supplies the control signal ($V_{control}$) to the input of the transconductance amplifier ($G_M$) 148 in order to compensate for and rectify the difference and aid in making the on-time and off-time the same. The current balancing stage 166 adjusts the voltage ($V_S$) representative of the current of the resonant tank 101 to cause the controller 102b to increase or decrease the on-time and off-time to reduce the difference between the on-time and the off-time.

When there is no difference between the on-time and off-time, the control signal ($V_{control}$) has a value of zero volts and the current balancing stage 166 does not alter operation of the controller 102b. However, when the on-time exceeds the off-time, the control signal ($V_{control}$) is additively combined with the voltage ($V_S$) to reduce the on-time. Conversely, when the off-time exceeds the on-time, the control signal ($V_{control}$) is additively combined with the voltage ($V_S$) to increase the on-time.

Figure 3:
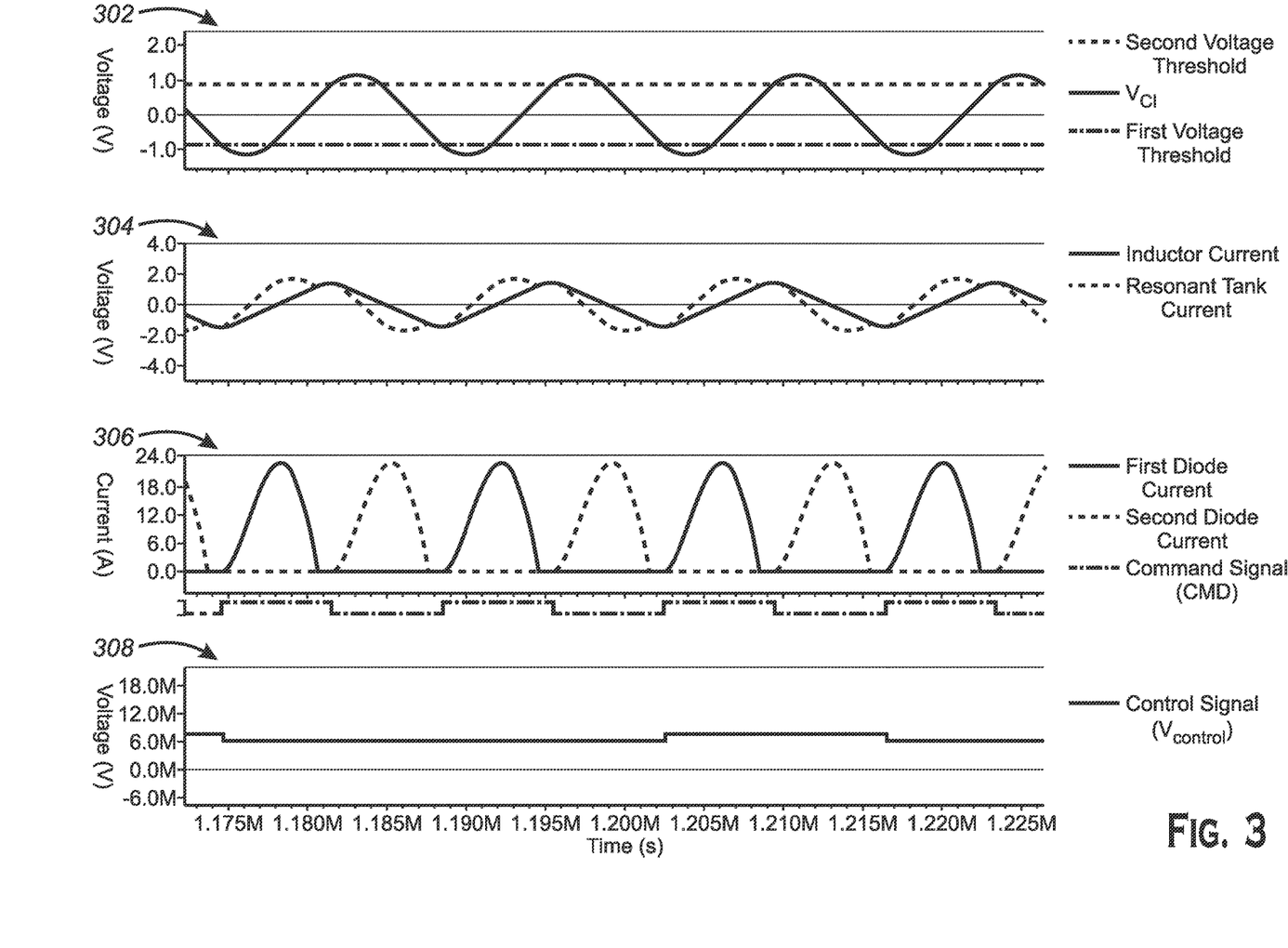
FIG. 3 shows diagrams of signals of the converter.

FIG. 3 shows diagrams of signals of the converter 100. A first diagram 302 shows the first and second voltage thresholds and the voltage ($V_{CI}$) of the control node 176. A second diagram 304 shows the voltage ($V_S$) representative of the current of the resonant tank 101 and an inductor current of the converter 100. A third diagram 306 shows the currents through the first and second diodes 124, 126 and the command signal (CMD). A fourth diagram 308 shows the control signal ($V_{control}$) of the current balancing stage 166.

When the transconductance amplifier ($G_M$) 148 has an offset at its input, the currents through the first and second diodes 124, 126 will be mismatched. As shown in FIG. 3, the control signal ($V_{control}$) converged at a voltage value alternating between 6 and 8 millivolts (mV) to compensate for the offset. The resulting currents through the first and second diodes 124, 126 are symmetrical during operation of the converter 100.

The techniques described herein may control any type of resonant converter based on a bang-bang control using two comparators and an integrator. In addition, although digital techniques are described herein, an analog technique may be used. For example, a first capacitance may be charged during the on-time and discharged during the off-time to determine the difference between the two time intervals. A voltage of the first capacitance may be sampled at the end of the switching period and then the first capacitance may be discharged after the sampling. For a preceding or succeeding switching period, a second capacitance may be similarly charged during the on-time and discharged during the off-time. The second capacitance may be sampled at the end of the preceding or succeeding switching period. The control signal ($V_{control}$) may be generated as a linear combination of the sampled voltages of the two capacitances.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A controller for a converter, comprising:
an input configured to receive a first signal representative of a current of a resonant tank of the converter; and
an output configured to provide a switching signal for operating the converter, wherein the controller is configured to:
determine a difference between an on-time and an off-time of a command signal representative of the switching signal;
generate a control signal based on the difference between the on-time and the off-time;
compensate the first signal using the control signal; and
generate the switching signal based on the compensated first signal.

2. The controller of claim 1, wherein the controller is configured to compensate the first signal using the control signal by adding the control signal to the first signal to produce the compensated first signal.

3. The controller of claim 1, wherein the controller is configured to generate the control signal as a sum of the difference between the on-time and the off-time in a first switching period and one or more sums of respective differences between the on-time and the off-time in preceding switching periods of the first switching period.

4. The controller of claim 3, wherein the controller is configured to weigh the difference in the first switching period or the differences in the preceding switching periods by a weight in the sum.

5. The controller of claim 1, comprising:
timing logic configured to:
receive a clock signal;
during one of the on-time or the off-time increment a counter every clock cycle of the clock signal;
during the other of the on-time or the off-time decrement the counter every clock cycle of the clock signal; and
determine the difference based on a count maintained by the counter.

6. The controller of claim 1, comprising:
a control node;
a transconductance amplifier configured to:
receive the compensated first signal; and
charge the control node based on the compensated first signal.

7. The controller of claim 6, wherein the control signal mitigates an offset at an input of the transconductance amplifier.

8. A method, comprising:
receiving, by a controller of a converter, a first signal representative of a current of a resonant tank of the converter;
outputting, by the controller, a switching signal for operating the converter; and
balancing, by the controller, diode currents of the converter by at least:
determining a difference between an on-time and an off-time of a command signal representative of the switching signal;
generating a control signal based on the difference between the on-time and the off-time;
compensating the first signal using the control signal; and
generating the switching signal based on the compensated first signal.

9. The method of claim 8, wherein compensating the first signal using the control signal includes adding the control signal to the first signal to produce the compensated first signal.

10. The method of claim 8, comprising:
generating the control signal as a sum of the difference between the on-time and the off-time in a first switching period and one or more sums of respective differences between the on-time and the off-time in preceding switching periods of the first switching period.

11. The method of claim 10, comprising:
weighing the difference in the first switching period or the differences in the preceding switching periods by a weight in the sum.

12. The method of claim 8, comprising:
receiving a clock signal;
during one of the on-time or the off-time, incrementing a counter every clock cycle of the clock signal;
during the other of the on-time or the off-time, decrementing the counter every clock cycle of the clock signal; and
determining the difference based on a count maintained by the counter.

13. The method of claim 8, comprising:
receiving, by a transconductance amplifier, the compensated first signal; and
charging, by the transconductance amplifier, a control node of the controller based on the compensated first signal.

14. The method of claim 13, wherein the control signal mitigates an offset at an input of the transconductance amplifier.

15. A system, comprising:
a converter; and
a controller including:
an input configured to receive a first signal representative of a current of a resonant tank of the converter; and
an output configured to provide a switching signal for operating the converter, wherein the controller is configured to:
determine a difference between an on-time and an off-time of a command signal representative of the switching signal;
generate a control signal based on the difference between the on-time and the off-time;
compensate the first signal using the control signal; and
generate the switching signal based on the compensated first signal.

16. The controller of claim 15, wherein the controller is configured to compensate the first signal using the control signal by adding the control signal to the first signal to produce the compensated first signal.

17. The controller of claim 15, wherein the controller is configured to generate the control signal as a sum of the difference between the on-time and the off-time in a first switching period and one or more sums of respective differences between the on-time and the off-time in preceding switching periods of the first switching period.

18. The controller of claim 17, wherein the controller is configured to weigh the difference in the first switching period or the differences in the preceding switching periods by a weight in the sum.

19. The controller of claim 15, wherein the controller includes:
timing logic configured to:

receive a clock signal;

during one of the on-time or the off-time increment a counter every clock cycle of the clock signal;

during the other of the on-time or the off-time decrement the counter every clock cycle of the clock signal; and determine the difference based on a count maintained by the counter.

20. The controller of claim 15, wherein the controller includes:

a control node;

a transconductance amplifier configured to:

receive the compensated first signal; and charge the control node based on the compensated first signal.

* * * * *